(No Model.)
H. M. HANMORE.
FIRE KINDLER.
No. 381,237. Patented Apr. 17, 1888.
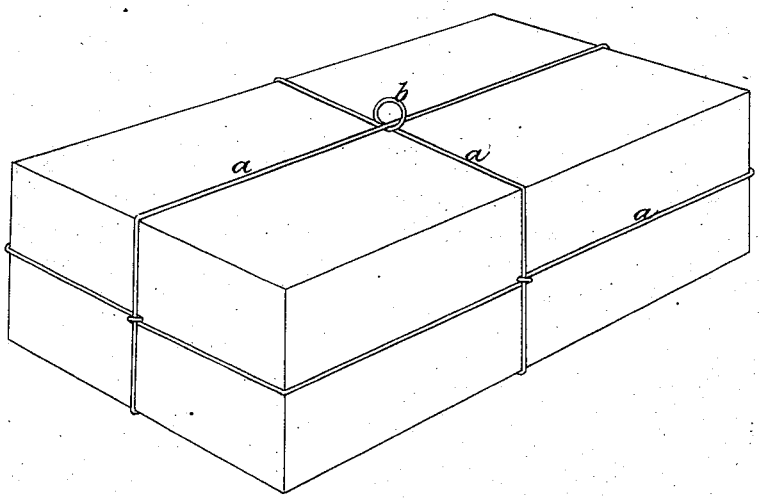
Witnesses:
Joseph W. Roe.
C. Sundgren.
Inventor.
Hiram M. Hanmore
by attorneys.
Brown & Hall.

UNITED STATES PATENT OFFICE.

HIRAM M. HANMORE, OF CAMDEN, NEW JERSEY.

FIRE-KINDLER.

SPECIFICATION forming part of Letters Patent No. 381,237, dated April 17, 1888.

Application filed January 4, 1888. Serial No. 259,757. (No specimens.)

*To all whom it may concern:*

Be it known that I, HIRAM M. HANMORE, a citizen of the United States, residing in the city and county of Camden, in the State of New Jersey, have invented a new and useful Improvement in Fuel-Cartridges, of which the following is a specification, reference being had to the accompanying drawing forming part of this specification.

This invention relates to fuel-cartridges composed of refractory substance for absorbing kerosene or other combustible liquid to be used as fuel, such cartridges being capable of being recharged with the liquid many times for repeated use.

The invention consists in a composition for such cartridges, including as absorbent elements carbonate of magnesia, calcined magnesia, and asbestus fiber. I prefer, generally, to use fifty (50) parts, by weight, of carbonate of magnesia, twenty (20) parts of calcined magnesia, and thirty (30) parts of asbestus fiber; but these proportions may be varied considerably without essentially changing the character of my composition.

The composition is used in the form of bricks or blocks of convenient form and size, which, to preserve them, may be bound with wire or metal bands, or inclosed in any open kind of metal-work.

The accompanying drawing represents a perspective view of a fuel-cartridge of my invention bound with a wire band, *a*, in which is constructed a loop, *b*, for the purpose of receiving the end of a lifting-rod by which to place it in or remove it from a stove or fireplace.

To make my composition I mix the carbonate of magnesia and calcined magnesia in a state of powder with the asbestus fiber in a finely-reduced state, and as much water as will make a thick paste, and form the mass in molds of considerable size into blocks, which when dried I saw into blocks of suitable size for the fuel-cartridges.

The value of this composition consists not only in the refractory character of the asbestus and calcined magnesia at high temperatures, but in the exceedingly absorbent nature of the calcined magnesia and carbonate of magnesia, which enables the compound to hold a large proportion of kerosene or other combustible liquid.

I have hereinabove stated that the relative proportions of the carbonate of magnesia and calcined magnesia may be varied without materially changing the character of my composition; but I have found by experiment that proportions hereinbefore stated are, all things considered, the best. The calcined magnesia alone, or too large a proportion of it, is difficult to keep cemented together; but it will stand a higher heat and bear a greater number of firings, while the carbonate of magnesia has a more binding quality and is cheaper. Therefore a proper proportion of the two makes the most serviceable composition. The composition is, however, so cheap that after having been once or twice used it might be thrown away.

What I claim as my invention, and desire to secure by Letters Patent, is—

A composition for fuel-cartridges, consisting of calcined magnesia, carbonate of magnesia, and asbestus fiber, in proportions substantially as herein set forth.

HIRAM M. HANMORE.

Witnesses:
 FREDK. HAYNES,
 C. E. LUNDGREN.